(12) United States Patent
Mishra

(10) Patent No.: US 12,715,292 B2
(45) Date of Patent: Aug. 25, 2026

(54) DISPLAY CONTROL DEVICE FOR ADAPTIVE ROTATION ANGLE CONTROL AND VEHICLE EMPLOYING DEVICE

(71) Applicants: Futaijing Precision Electronics (Yantai) Co., Ltd., Yantai (CN); HON HAI PRECISION INDUSTRY CO., LTD., New Taipei (TW)

(72) Inventor: Deepam Mishra, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 455 days.

(21) Appl. No.: 18/227,983

(22) Filed: Jul. 31, 2023

(65) Prior Publication Data

US 2024/0336134 A1 Oct. 10, 2024

(30) Foreign Application Priority Data

Apr. 7, 2023 (CN) ......................... 202320748859.5

(51) Int. Cl.
*B60K 35/53* (2024.01)
*B60K 35/22* (2024.01)

(52) U.S. Cl.
CPC .............. *B60K 35/53* (2024.01); *B60K 35/22* (2024.01)

(58) Field of Classification Search
CPC ..... B60R 11/0235; B60K 35/00; B60K 35/22; B60K 2360/48
See application file for complete search history.

(56) References Cited

U.S. PATENT DOCUMENTS

| | | | | |
|---|---|---|---|---|
| 11,220,182 | B1 * | 1/2022 | Fisker | B60K 35/60 |
| 11,465,502 | B1 * | 10/2022 | Fisker | B60R 11/0229 |
| 2010/0039055 | A1 * | 2/2010 | Jeung | H02P 6/00 318/400.35 |
| 2013/0120458 | A1 * | 5/2013 | Celebisoy | G06F 3/147 345/619 |
| 2013/0147847 | A1 * | 6/2013 | Koseki | B60R 11/0235 345/660 |
| 2013/0328935 | A1 * | 12/2013 | Tu | G06F 1/1694 345/651 |
| 2018/0011551 | A1 * | 1/2018 | Gothlin | B60K 35/60 |
| 2019/0135192 | A1 * | 5/2019 | Adamson, Sr. | B60R 16/03 |
| 2021/0129671 | A1 * | 5/2021 | Miyake | B60K 35/60 |
| 2022/0348148 | A1 * | 11/2022 | Fitzpatrick | B60N 2/22 |

* cited by examiner

*Primary Examiner* — Nicholas Klicos
(74) *Attorney, Agent, or Firm* — ScienBiziP, P.C.

(57) ABSTRACT

A display control device comprises a rotation controller, and a drive circuit. The rotation controller is configured to control the drive circuit to output a first drive signal to drive the display screen to convert to landscape when receiving the first rotation signal, and control the drive circuit to output a second drive signal to drive the display screen to convert to portrait when receiving the second rotation signal. The rotation controller is further configured to control the drive circuit according to the vehicle status signal to drive the display screen to a corresponding position, and control the drive circuit to suspend working when the vehicle is in a driving state. The rotation controller can control the drive circuit according to different vehicle status signals, so as to drive the display screen to rotate to the appropriate position following the vehicle status, thus improving the driver's comfort and safety.

15 Claims, 3 Drawing Sheets

DISPLAY CONTROL DEVICE FOR ADAPTIVE ROTATION ANGLE CONTROL AND VEHICLE EMPLOYING DEVICE

TECHNICAL FIELD

The subject matter herein generally relates to display devices of vehicle.

BACKGROUND

Nowadays, multiple functions of a vehicle multimedia become richer and richer, and settings of vehicle display screen also have different forms to adapt to the multiple functions of the vehicle multimedia. For example, the display screen can be set to portrait direction to display the navigation route more comprehensively, so that users can avoid distracting operation of the display during driving. Or the display screen can be set to the landscape direction, allowing users to switch, select, and view information while playing music or talking. However, the sudden turning of the display screen in the process of driving will affect the driver's normal driving, and even cause safety accidents.

BRIEF DESCRIPTION OF THE DRAWINGS

Implementations of the present technology will now be described, by way of example only, with reference to the attached figures.

DETAILED DESCRIPTION

Figure 1:
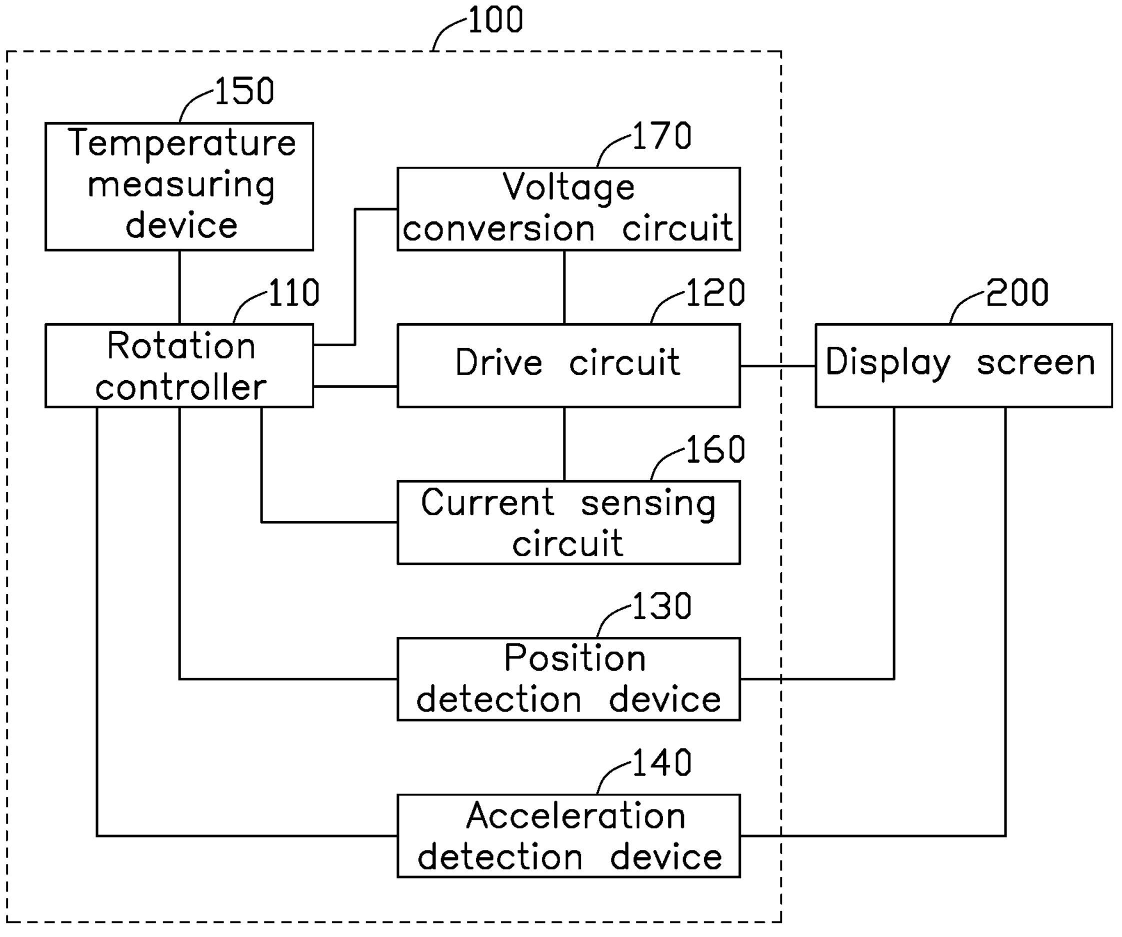
FIG. 1 is a diagram of one embodiment of a display control device according to the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a diagram of a display control device 100 in one embodiment of the present application. The display control device 100 can be set in a vehicle 1 and configured to control a display screen to change to a proper working condition and position as a change of a driving state of the vehicle 1.

The display control device 100 comprises a rotation controller 110 and a drive circuit 120. The rotation controller 110 is configured to receive a first rotation signal, a second rotation signal, and a vehicle status signal. An input end of the drive circuit 120 is electrically connected with the rotation controller 110, an output end of the drive circuit 120 is electrically connected with a display screen 200. The rotation controller 110 is configured to control the drive circuit 120 to output a first drive signal to drive the display screen 200 to a landscape state when receiving the first rotation signal. The rotation controller 110 is further configured to control the drive circuit 120 to output a second drive signal to drive the display screen 200 to a portrait state when receiving the second rotation signal.

In one embodiment, the rotation controller 110 is further configured to control the drive circuit 120 to drive the display screen 200 to a corresponding position according to the vehicle status signal, and the rotation controller 110 is further configured to control the drive circuit 120 to suspend working when the vehicle 1 is in a driving state. The rotation controller 110 can be a chip like microprocessor, Field Programmable Gate Array (FPGA) and so on. The drive circuit 120 can comprise Metal-Oxide-Semiconductor Field-Effect Transistors, resistors, and capacitors.

In one embodiment, the vehicle state signal can comprise a first state signal indicating that the vehicle 1 is igniting and starting, a second state signal indicating that the vehicle 1 enters a reverse state, a third state signal indicating that the vehicle 1 enters a driving state, a fourth state signal indicating that the vehicle 1 is in a stopped state, etc. The rotation controller 110 can control the drive circuit 120 to drive the display screen 200 according to different states of the vehicle 1, so as to drive the display screen 200 to rotate to appropriate position with the change of the vehicle 1 states.

For example, when the vehicle 1 is ignited and started, the rotation controller 110 receives the first state signal indicating that the vehicle 1 is igniting and starting, and controls the drive circuit 120 to output the corresponding drive signal to drive the display screen 200 to the portrait state. Thus, when the vehicle 1 is ignited and started, the display screen 200 can automatically rotate to the portrait state to make the display screen 200 at a proper position for viewing, so as to facilitate the driver to view navigation, media information, etc., without manually adjusting the position of the display screen 200, so as to avoid traffic accidents caused by distracted operation of the display screen 200 when the vehicle 1 is ignited and started.

When the vehicle 1 enters the reverse state (for example, a gear shift of the vehicle 1 is switched to a reverse gear), the rotation controller 110 receives the second state signal indicates that the vehicle 1 enters the reverse state, and controls the drive circuit 120 to output the corresponding drive signal to drive the display screen 200 to the portrait state. Thus, when the driver switches the gear shift to the reverse gear, the display screen 200 can automatically rotate to the portrait state, which is convenient for the driver to view reverse images. The driver does not need to manually adjust the position of the display screen 200, so as to avoid a collision caused by distracted operation of the display screen 200 when the vehicle 1 is in the reverse state.

When the vehicle 1 enters the driving state (for example, the gear shift is switched to a forward gear, which can be D, S, L, etc.), the rotation controller 110 receives the third state signal indicates that the vehicle 1 enters the driving state, and controls the drive circuit 120 to output the corresponding drive signal to drive the display screen 200 to convert to the portrait state. Thus, once the vehicle 1 enters the driving state, the display screen 200 can automatically rotate to the portrait state, which is convenient for the driver to view the navigation information, the media information, etc., during the driving process. The driver does not need to manually adjust the position of the display screen 200, so as to avoid traffic accidents caused by distracted operation of the display screen 200 during the driving process.

When the vehicle 1 stops (for example, the gear shift is in a park gear, which can be referred to as P gear), the rotation controller 110 receives the fourth state signal indicating that the vehicle 1 is in the stopped state, and controls the drive circuit 120 to drive the display screen 200 to rotate to the landscape/portrait state, or it can control the drive circuit 120 not working to keep the original position of the display screen 200.

Further, the rotation controller 110 is configured to control the drive circuit 120 to suspend working after the vehicle 1 enters the driving state. That is, the rotation controller 110 can disable the drive circuit 120 after the vehicle 1 enters the driving state and the rotation controller 110 controls the drive circuit 120 to drive the display screen 200 to the portrait state. At this time, if the rotation controller 110 receives other rotation control signals except the first rotation signal and the second rotation signal, it would not control the drive circuit 120 to output drive signal, and the display screen 200 will remain portrait. Thus, a sudden rotating of the display screen 200 caused by circuit failure or software failure, which may affect the driver, can be avoid, and improving the safety in the process of driving. In addition, the rotation controller 110 can also disable the drive circuit 120 to improve the safety of the vehicle 1 after receiving the first state signal indicating the starting of the vehicle 1 or the second state signal indicating the reversing state of the vehicle 1 and controlling the rotating of the display screen 200.

The driver circuit 120 is controlled by the rotation controller 110 according to different vehicle status signals, so as to drive the display screen 200 to rotate to the appropriate position following the vehicle 1 status and improve the driver's comfort and safety. After the vehicle 1 enters the driving state, the rotation controller 110 disables the drive circuit 120, reducing a danger caused by circuit failure or software failure in the driving state, and further improve the safety of the vehicle 1.

In one embodiment, the display control device 100 further comprises a position detection device 130. The position detection device 130 is electrically connected with the rotation controller 110, the position detection device 130 is configured to detect the position of the display screen 200, and output a landscape position signal when detecting the display screen 200 is in the landscape state, and output a portrait position signal when detecting the display screen 200 is in the portrait state. The rotation controller 110 is further configured to control the drive circuit 120 to suspend outputting the first drive signal or the second drive signal when receiving the landscape position signal or the portrait position signal. The rotation controller 110 is further configured to control the drive circuit 120 to continue outputting the first drive signal or the second drive signal when not receiving the landscape position signal or the portrait position signal.

In this embodiment, the position detection device 130 is configured to detect the position of the display screen 200 and feedback the position information of the display screen 200 to the rotation controller 110, so that the display screen 200 can rotate to the objective position. For example, the rotation controller 110 controls the drive circuit 120 outputting the first drive signal to drive the display screen 200 to rotate to the landscape position when the rotation controller 110 receives the first rotation signal. At the same time, the position detection device 130 detects the position of the display screen 200. When the position detection device 130 detects that the display screen 200 is not in the landscape position, the rotation controller 110 controls the drive circuit 120 to continue outputting the first drive signal until the position detection device 130 detects that the display screen 200 is in the landscape position, and then the rotation controller 110 controls the drive circuit 120 to suspend outputting the first drive signal. Thus, the display screen 200 can be guaranteed to accurately rotate to the objective position and improve the accuracy of the rotation position.

In one embodiment, the position detection device 130 comprises a first photoelectric sensor 131 electrically connected with the rotation controller 110, the first photoelectric sensor 131 is configured to output the landscape position signal when detecting the landscape position of the display screen 200.

In this embodiment, the landscape position of the display screen 200 is detected by the first photoelectric sensor 131. When the display screen 200 is rotated from a non-landscape position to the landscape position, an optical path of the first photoelectric sensor 131 is blocked/connected to generate the landscape position signal outputting to the rotation controller 110.

In one embodiment, the position detection device 100 comprises a second photoelectric sensor 132 electrically connected with the rotation controller 110, the second photoelectric sensor 132 is configured to output the portrait position signal when detecting the portrait position of the display screen 200.

In this embodiment, the portrait position of the display screen 200 is detected by the second photoelectric sensor 132. When the display screen 200 is rotated from a non-portrait position to the portrait position, an optical path of the second photoelectric sensor 132 is blocked/connected to generate the portrait position signal outputting to the rotation controller 110.

Figure 2:
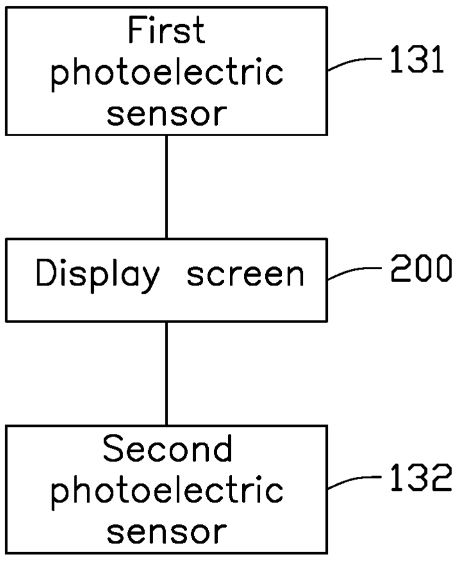
FIG. 2 is a diagram of one embodiment of an acceleration detection device according to the present application.

FIG. 2 is a diagram of one embodiment of an acceleration detection device.

In one embodiment, the display control device 100 further comprises the acceleration detection device 140 electrically connected with the rotation controller 110, the acceleration detection device 140 is configured to detect the rotation acceleration of the display screen 200. The rotation controller 110 is further configured to control the drive circuit 120 to reduce a current of the first drive signal or the second drive signal when the rotation acceleration is greater than or equal to a preset acceleration, and control the drive circuit 120 to increase the current of the first drive signal or the second drive signal when the rotation acceleration is less than the preset acceleration.

In this embodiment, the acceleration detection device 140 is configured to detect the rotation acceleration of the display screen 200 so that the rotation controller 110 can control the acceleration or deceleration of the display screen 200 according to the rotation acceleration of the display screen 200. For example, when the display screen 200 starts rotating, the rotation acceleration is slow. At this time, the rotation controller 110 can control the drive circuit 120 to increase the current of the driving signal, so as to increase the rotation acceleration of the display screen 200, and the display screen 200 can quickly rotate to the objective position. When the rotation acceleration of the display screen 200 is greater than or equal to the preset acceleration, it is necessary to control the display screen 200 to decelerate; otherwise, the display screen 200 will exceed the objective position. At this time, the rotation controller 110 controls the drive circuit 120 to reduce the current of the drive signal, so as to reduce the rotation acceleration of the display screen 200, and the display screen 200 can accurately and smoothly rotate to the objective position.

Wherein the acceleration detection device 140 can be a Hall sensor. The preset acceleration can be set according to the actual application scenario. For example, it may take two seconds for the display screen 200 to rotate from the initial position to the objective position. The preset acceleration can be set as the acceleration when the display screen 200 accelerates to one second. Thus, the rotation time of display screen 200 can be reduced and the accurate rotation of the display screen 200 to the objective position can be ensured. In addition, there is no pause in acceleration and deceleration during rotation, which makes the rotation of the display screen 200 more smooth, thus making the user's view and feeling more comfortable.

In one embodiment, the display control device 100 further comprises a temperature measuring device 150 electrically connected with the rotation controller 110, the temperature detecting device 150 is configured to detect the temperature of the rotation controller 110. The rotation controller 110 is further configured to suspend working when the temperature detected by the temperature detecting device 150 is greater than or equal to a preset temperature, to avoid circuit damage caused by high working temperature of the rotation controller 110.

In one embodiment, the temperature measuring device 150 can be a temperature sensor.

In one embodiment, the display control device 100 further comprises a current detection circuit 160 electrically connected with the rotation controller 110 and the drive circuit 120. The rotation controller 110 is further configured to control the drive circuit 120 to suspend working when the current detected by the current sensing circuit 160 is greater than or equal to a preset current, to avoid excessive working current of the drive circuit 120, which may cause rotation stall of the display screen 200 and cause accidents.

In one embodiment, the current detection circuit 160 can comprise resistors.

In one embodiment, the display control device 100 further comprises a voltage conversion circuit 170, an input end of the voltage conversion circuit 170 is configured to access the supply voltage, and an output end of the voltage conversion circuit 170 is electrically connected with the rotation controller 110 and the drive circuit 120 respectively. The voltage conversion circuit 170 is configured to convert the supply voltage to a first voltage outputting to the rotation controller 110 and convert the supply voltage to a second voltage outputting to the drive circuit 120.

The voltage conversion circuit 170 converts the supply voltage to the first voltage required for the operation of the rotation controller 110 and the second voltage required for the operation of the drive circuit 120, so that the rotation controller 110 and the drive circuit 120 can work normally.

The voltage conversion circuit 170 can comprise level conversion chips and/or buck circuits. For example, the voltage conversion circuit 170 can comprise two buck circuits. The supply voltage can be 12V. The first voltage can be 5V. The second voltage can be 3.3V.

In one embodiment, the rotation controller 110 is further configured to control the drive circuit 120 into a sleep mode after controlling the display screen 200 to complete a rotation, so as to reduce the loss of the drive circuit 120 when it is not working, and thus reduce the circuit power consumption.

Figure 3:
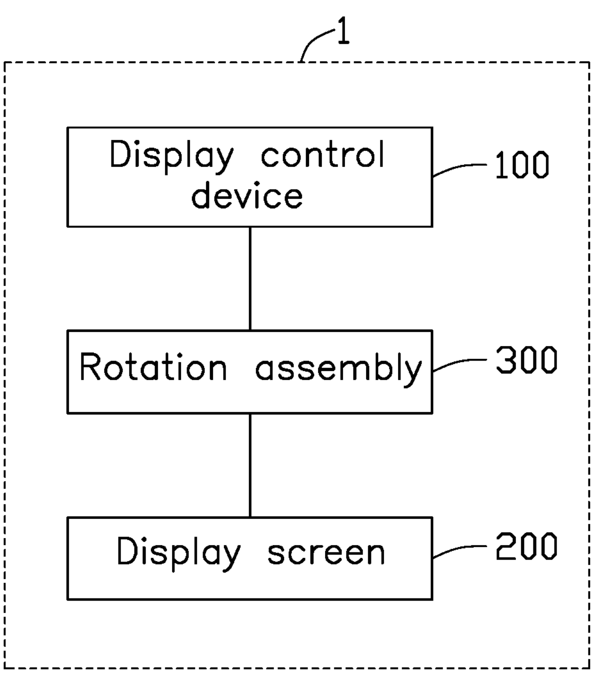
FIG. 3 is a diagram of one embodiment of a vehicle according to the present application.

FIG. 3 is a diagram of one embodiment of the vehicle 1. The vehicle 1 comprises a display screen 200 and a display control device 100.

In one embodiment, the vehicle 1 further comprises a rotation assembly 200 electrically connected with the display control device 100, and the rotation assembly 300 is connected with the display screen 200. The rotation assembly 300 is configured to output a driving signal to drive the rotation assembly 300 to drive the rotation assembly 300 to rotate and thus drive the display screen 200 to rotate.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A display control device, applied to a vehicle, the display control device comprising:

a rotation controller configured to receive a first rotation signal, a second rotation signal, and a vehicle status signal;

a drive circuit, an input end of the drive circuit being electrically connected with the rotation controller, and an output end of the drive circuit being electrically connected with a display screen; and an acceleration detection device;

wherein the rotation controller is configured to control the drive circuit to output a first drive signal to drive the display screen to a landscape state in response to receiving the first rotation signal, and control the drive circuit to output a second drive signal to drive the display screen to a portrait state in response to receiving the second rotation signal, and the rotation controller is further configured to control the drive circuit to drive the display screen to a corresponding position according to the vehicle status signal, and the rotation controller is further configured to control the drive circuit to suspend working in response to the vehicle being in a driving state;

wherein the acceleration detection device is electrically connected with the rotation controller, the acceleration detection device is configured to detect a rotational acceleration of the display screen, the rotation controller is further configured to control the drive circuit to reduce a current of the first drive signal or a current of the second drive signal in response to the rotation acceleration being greater than or equal to a preset acceleration, and the rotation controller is further configured to control the drive circuit to increase the current of the first drive signal or the current of the second drive signal in response to the rotation acceleration being less than the preset acceleration.

2. The display control device of claim 1, further comprising a position detection device electrically connected with the rotation controller, wherein the position detection device is configured to detect a position of the display screen, and output a landscape position signal in response to the display screen being in the landscape state, and output a portrait position signal in response to the display screen being in the portrait state, and the rotation controller is further configured to control the drive circuit to suspend outputting the first drive signal or the second drive signal in response to receiving the landscape position signal or the portrait position signal, or the rotation controller is further configured to control the drive circuit to continue outputting the first drive signal or the second drive signal in response to not receiving the landscape position signal or the portrait position signal.

3. The display control device of claim 2, wherein the position detection device comprises a first photoelectric sensor electrically connected with the rotation controller, and the first photoelectric sensor is configured to output the landscape position signal in response to the display screen being in the landscape state.

4. The display control device of claim 2, wherein the position detection device comprises a second photoelectric sensor electrically connected with the rotation controller, and the second photoelectric sensor is configured to output the portrait position signal in response to the display screen being in the portrait state.

5. The display control device of claim 1, further comprising a temperature measuring device, wherein the temperature measuring device is electrically connected with the rotation controller, the temperature detecting device is configured to detect a temperature of the rotation controller, and the rotation controller is further configured to suspend working in response to the temperature detected by the temperature detecting device being greater than or equal to a preset temperature.

6. The display control device of claim 1, further comprising a current detection circuit, wherein the current detection circuit is electrically connected with the rotation controller and the drive circuit, and the rotation controller is further configured to control the drive circuit to suspend working in response to a current detected by the current sensing circuit being greater than or equal to a preset current.

7. The display control device of claim 1, further comprising a voltage conversion circuit, wherein an input end of the voltage conversion circuit is configured to receive a supply voltage, and an output end of the voltage conversion circuit is electrically connected with the rotation controller and the drive circuit respectively, the voltage conversion circuit is configured to convert the supply voltage to a first voltage to output to the rotation controller, and the voltage conversion circuit is configured to convert the supply voltage to a second voltage to output to the drive circuit.

8. A vehicle comprising a display screen and a display control device, the display control device comprising:

a rotation controller configured to receive a first rotation signal, a second rotation signal, and a vehicle status signal;

a drive circuit, an input end of the drive circuit being electrically connected with the rotation controller, and an output end of the drive circuit being electrically connected with a display screen, wherein the rotation controller is configured to control the drive circuit to output a first drive signal to drive the display screen to a landscape state in response to receiving the first rotation signal, and control the drive circuit to output a second drive signal to drive the display screen to a portrait state in response to receiving the second rotation signal, and the rotation controller is further configured to control the drive circuit to drive the display screen to a corresponding position according to the vehicle status signal, and the rotation controller is further configured to control the drive circuit to suspend working in response to the vehicle being in a driving state;

wherein the display control device further comprises an acceleration detection device, the acceleration detection device is electrically connected with the rotation controller, the acceleration detection device is configured to detect a rotational acceleration of the display screen, the rotation controller is further configured to control the drive circuit to reduce a current of the first drive signal or a current of the second drive signal in response to the rotation acceleration being greater than or equal to a preset acceleration, and the rotation controller is further configured to control the drive circuit to increase the current of the first drive signal or the current of the second drive signal in response to the rotation acceleration being less than the preset acceleration.

9. The vehicle of claim 8, wherein the vehicle further comprises a rotation assembly electrically connected with the display control device, and the rotation assembly is connected with the display screen, and the rotation assembly is configured to output a driving signal to drive the rotation assembly to drive the rotation assembly to rotate and thus drive the display screen to rotate.

10. The vehicle of claim 8, wherein the display control device further comprises a position detection device electrically connected with the rotation controller, the position detection device is configured to detect a position of the display screen, and output a landscape position signal in response to the display screen being in the landscape state, and output a portrait position signal in response to the display screen being in the portrait state, and the rotation controller is further configured to control the drive circuit to suspend outputting the first drive signal or the second drive signal in response to receiving the landscape position signal or the portrait position signal, or the rotation controller is further configured to control the drive circuit to continue outputting the first drive signal or the second drive signal in response to not receiving the landscape position signal or the portrait position signal.

11. The vehicle of claim 10, wherein the position detection device comprises a first photoelectric sensor electrically connected with the rotation controller, and the first photoelectric sensor is configured to output the landscape position signal in response to the display screen being in the landscape state.

12. The vehicle of claim 10, wherein the position detection device comprises a second photoelectric sensor electrically connected with the rotation controller, and the second photoelectric sensor is configured to output the portrait position signal in response to the display screen being in the portrait state.

13. The vehicle of claim 8, wherein the display control device further comprises a temperature measuring device, the temperature measuring device is electrically connected with the rotation controller, the temperature detecting device is configured to detect a temperature of the rotation controller, and the rotation controller is further configured to suspend working in response to the temperature detected by the temperature detecting device being greater than or equal to a preset temperature.

14. The vehicle of claim 8, wherein the display control device further comprises a current detection circuit, the current detection circuit is electrically connected with the rotation controller and the drive circuit, and the rotation controller is further configured to control the drive circuit to suspend working in response to a current detected by the current sensing circuit being greater than or equal to a preset current.

15. The vehicle of claim 8, wherein the display control device further comprises a voltage conversion circuit, an input end of the voltage conversion circuit is configured to receive a supply voltage, and an output end of the voltage conversion circuit is electrically connected with the rotation controller and the drive circuit respectively, the voltage conversion circuit is configured to convert the supply voltage to a first voltage to output to the rotation controller, and the voltage conversion circuit is configured to convert the supply voltage to a second voltage to output to the drive circuit.

* * * * *